June 17, 1958 E. B. LOPKER ET AL 2,839,194
CONTINUOUS FILTRATION PROCESS AND APPARATUS THEREFOR
Filed Jan. 8, 1957 6 Sheets-Sheet 1

INVENTORS
Edwin B. Lopker
Emil M. Stolz, Jr.
BY Adams, Forward and McLean
ATTORNEYS June 17, 1958 E. B. LOPKER ET AL 2,839,194
CONTINUOUS FILTRATION PROCESS AND APPARATUS THEREFOR
Filed Jan. 8, 1957 6 Sheets-Sheet 2

INVENTORS
Edwin B. Lopker
Emil M. Stoltz, Jr.
BY
Adams, Forward and McLean
ATTORNEYS June 17, 1958  E. B. LOPKER ET AL  2,839,194
CONTINUOUS FILTRATION PROCESS AND APPARATUS THEREFOR
Filed Jan. 8, 1957  6 Sheets-Sheet 3

INVENTORS
Edwin B. Lopker
Emil M. Stoltz, Jr.
BY
Adams, Forward & McLean
ATTORNEYS

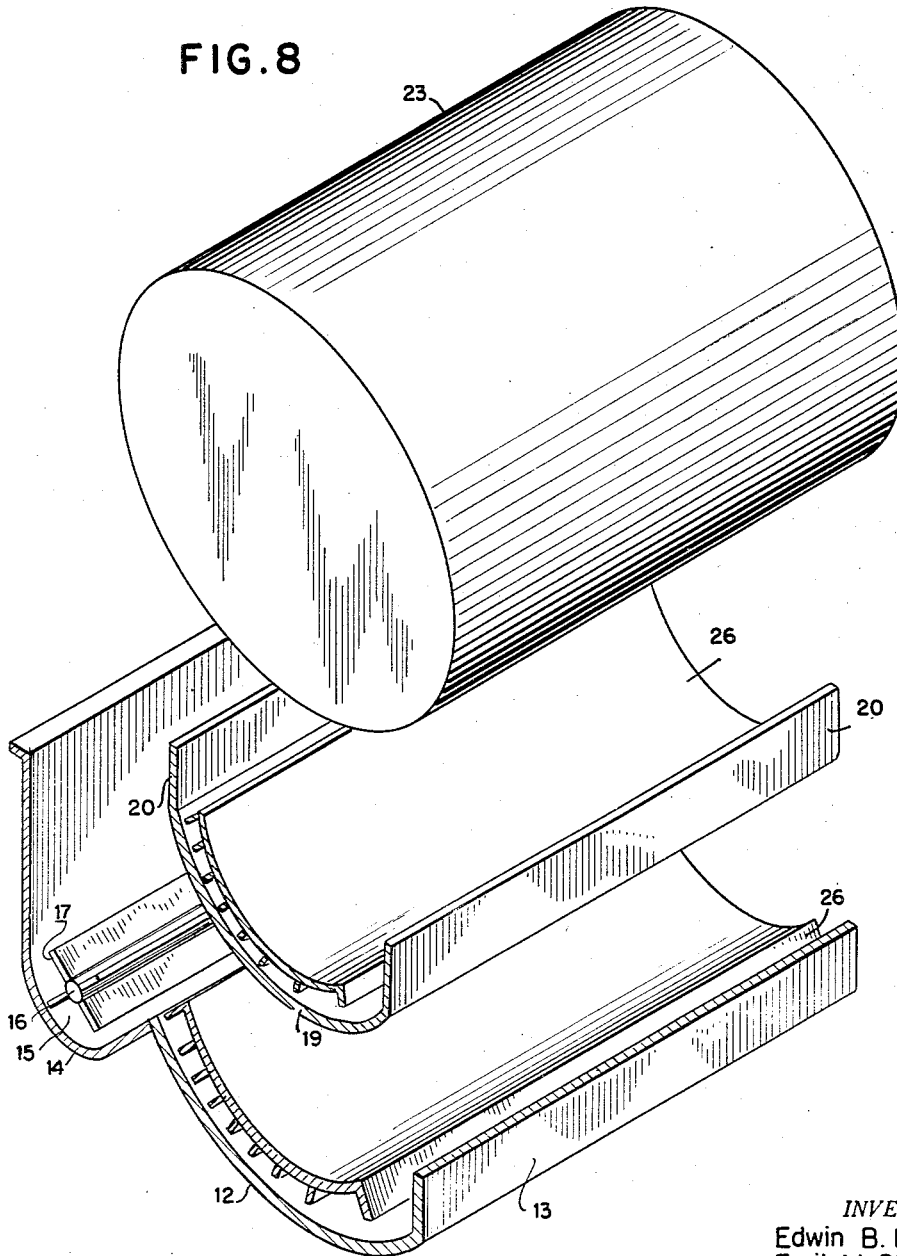

June 17, 1958     E. B. LOPKER ET AL     2,839,194
CONTINUOUS FILTRATION PROCESS AND APPARATUS THEREFOR
Filed Jan. 8, 1957     6 Sheets-Sheet 6
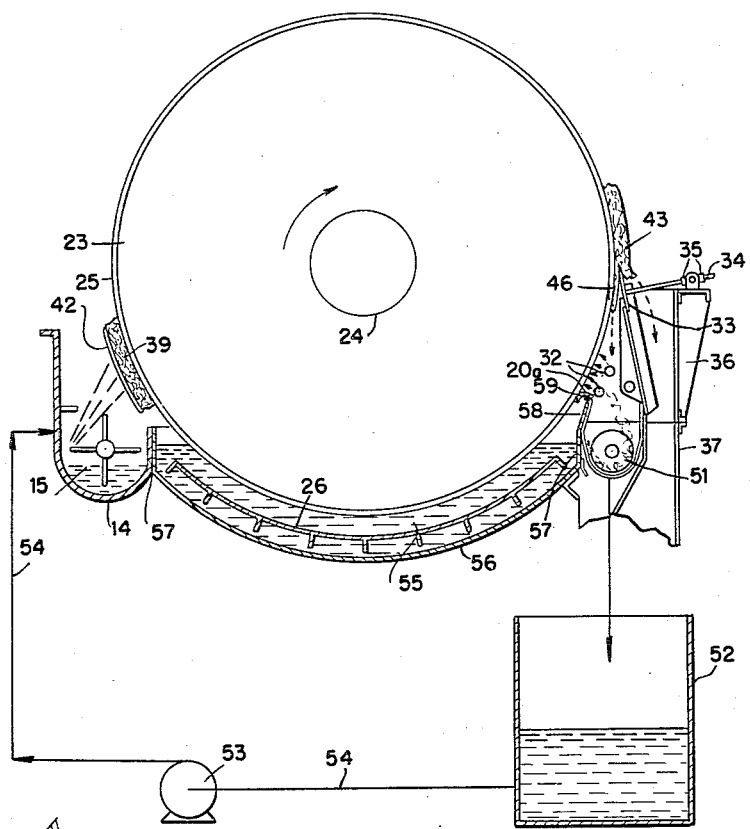
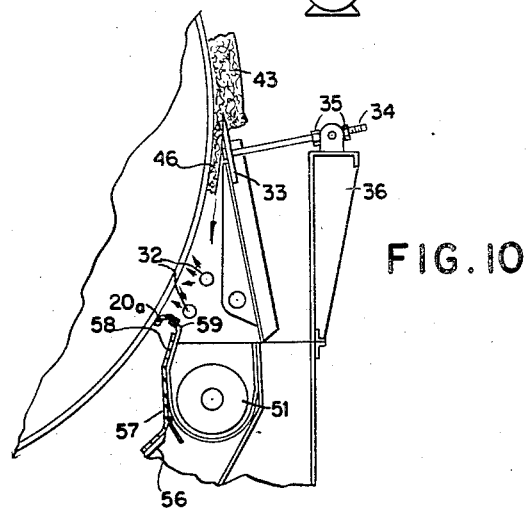
INVENTORS
Edwin B. Lopker
Emil M. Stoltz, Jr.
ATTORNEYS United States Patent Office 2,839,194
Patented June 17, 1958

2,839,194

CONTINUOUS FILTRATION PROCESS AND APPARATUS THEREFOR

Edwin B. Lopker and Emil M. Stoltz, Jr., Joliet, Ill., assignors to Olin Mathieson Chemical Corporation, a corporation of Virginia Application January 8, 1957, Serial No. 633,099

20 Claims. (Cl. 210—66)

Our invention relates to a novel method of filtration and to novel filters. In particular, our invention relates to improvements in pressure or vacuum filters and filtration methods wherein filtration is accomplished by a difference of fluid pressure at opposite sides of a filter cloth which passes periodically through a slurry of the solid material to be filtered in a cyclic operation to form continuously a cake of the solids on the cloth which is then removed.

A conventional example of such a filtering operation is the widely used rotary vacuum filter in which a hollow drum with a filter cloth on the outer part of the drum rotates through a zone, e. g., a pan or tank, containing a slurry of the solid material to be filtered. Vacuum is applied within the drum and liquid is thus drawn through the filter cloth depositing the suspended solids on the drum as a cake. This cake is formed and removed continuously and the operation is repeated. Since an efficient separation between liquid and solids is necessary, the cake is usually washed between the cake forming step and cake removal step with a series of sprays as the drum rotates. The sprays may wash the cake with weak liquid from prior operation, with water, or with some combination of weak liquid and water. The wash liquor gradually displaces the liquid from the cake so that when the cake reaches the removal position the separation of the liquid values from the solid values is theoretically, but not actually, complete. The liquid collected in the washing position is usually called "weak liquor" and is usually recycled for reprocessing. The cake is removed from the filter in various manners, such as cutting off essentially all of the cake with a knife running the length of the filter face or by blowing it off, e. g. cutting off the vacuum and blowing air through the pipes against the back side of the filter cloth thus dislodging the cake. The cake falls down a chute, for example, and is discarded or saved as desired. The filter drum is then ready to pick up a new cake and the cycle is repeated.

While this method of filtration is widely used, it is subject to certain disadvantages. Specifically, problems arise from undesirable dilution of the slurry, in removing the cake, in keeping the filter medium clean and free from obstruction and in loss of vacuum due to cracks that form in the cake and in loss of liquid filtrate. These cause low product concentrations, low through-put capacity, high losses, and costly production stoppages.

Dilution of the slurry and resultant lowering of the concentration of the filtered product frequently occur when the particle size and shape of the solids in the slurry do not lend themselves to good washing. In this situation, the wash water applied to the cake between the cake forming and cake removal steps is not sucked through the cake as rapidly as desired and some of the wash water runs off the cake and falls into the feed slurry pan thus diluting the slurry and lowering the concentration of the filtrate.

Problems concerning the removal of the cake arise in the following manner. The entire cake is usually removed each revolution. It is known that the outside of the filter cake is washed the best and that the washing efficiency becomes progressively poorer and poorer from the outside of the cake towards the cake next to the filter cloth. Most of the loss in recoverable values left in the cake is concentrated in the cake next to the filter cloth. If the cake is blown off, these values usually are unrecoverable since the cost of repulping and refiltering the cake more than offsets the values recoverable. If the well-washed portion of the cake is cut off with a knife or is removed by some other means, in most instances no provisions are made to remove the filter cake remaining on the cloth. If this cake is not removed, the cloth very rapidly plugs or "blinds" and the filter loses its capacity. In some cases, the cake remaining on the cloth is blown off the cloth into the feed slurry pan. When the liquid in the slurry is the valuable constituent, it is very badly diluted by the cake which contains very dilute wash liquid and dilute wash liquid blown out of the internal piping and drum sections. In many cases in which the cake is the valuable constituent, the wash liquid in the cake blown back into the feed slurry pan will dissolve cake and make it necessary to handle more "mother liquor" which must be recycled and evaporated to recover valuble constituents.

No provisions or very complicated provisions are usually made to keep the filter cloth clean, i. e. remove any remaining filter cake on the cloth after cake removal, while the drum is in operation. Some residual cake always remains on the cloth following the cake removal step and if only the outer portion of the cake is removed, a substantial amount remains. If no provision is made for cleaning, the filter cloth soon plugs and the filter must be removed from production either to clean the filter cloth or replace it. In one system, the filter cloth is continuously removed from the filter and by means of a series of rolls and guides is washed and returned to the filter. Substantial mechanical problems are involved in this method, however.

In many cases the physical characteristics of the solids are of such a nature that the cake shrinks and cracks, or fissures, form in the cake when vacuum is applied. This results in loss of vacuum and loss in capacity. Wash water tends to run through these cracks instead of the cake resulting in extra dilution of the filtrate and poorly washed cake. Also, the resulting low vacuum allows additional wash water to run off the cake and fall into the feed slurry pan thus diluting the slurry and lowering the concentration of filtrate.

Due to the great difficulty in thoroughly draining the internal piping of the filter, a filter using a reverse air blow to dislodge the cake at the cake removal position loses recoverable liquid values due to entrainment of liquid values in the air stream. These liquid values are actually blown through the filter medium and into the discharging cake. Some of this entrained liquid also runs down into the feed slurry pan causing undesirable dilution of the slurry.

We have found that the above described disadvantages are effectively eliminated by operating the filter so that an outer portion of the formed cake is removed continuously leaving an inner portion of the filter cake which is also then removed continuously and forming a slurry of this removed inner portion of the cake while maintaining this slurry separate from the main feed slurry and then applying this slurry to the newly formed filter cake to form a coating on the outer surface of the cake. Advantageously, the filter cake is washed after the coating step and before the cake removal step. Also, advantageously, the filter cloth is washed after the cake removal step and before entry of the filter medium into the feed slurry again.

The process and apparatus of our invention will be more clearly illustrated by reference to the accompanying drawings which illustrate two particularly preferred novel rotary drum vacuum filters suitable for carrying out the method of our invention.

Figure 8 is an isometric exploded view of the pan, flinger and drum arrangement.

Figure 9 is a schematic sectional view of another rotary drum filter similar to that of Figures 1 to 4 but having an extraneous tank for receiving the inner portion of the cake.

Figure 10 is a detail view of the cake removal means of Figure 9.

Figure 1:
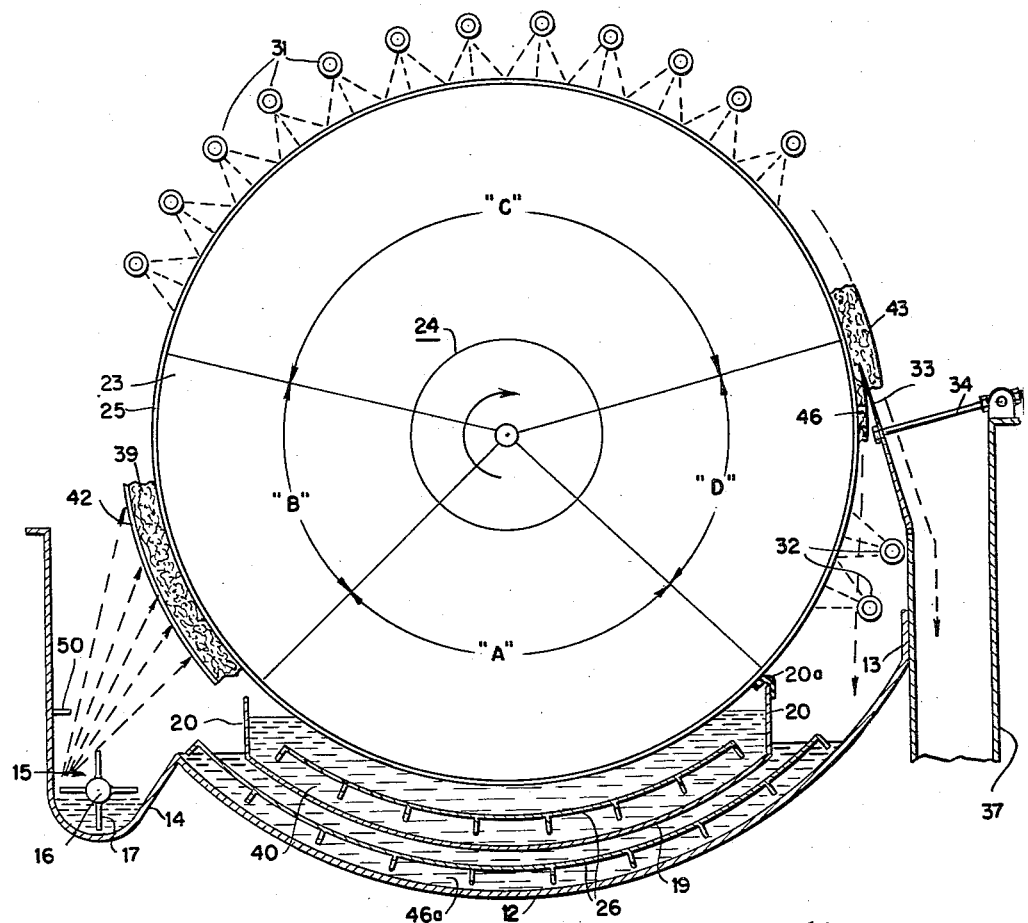
Figure 1 is a schematic drawing of a section through one of the rotary drum filters illustrating the method of operation. This filter is characterized by a double pan arrangement in which the inner pan contains the feed slurry and the outer pan receives the inner portion of the cake.

In the drawings, a base structure 10 supports members 11 which support a frame structure 21 which supports the entire filter pan assembly. The outer filter slurry receptacle or pan is formed with major arcuate wall 12 and side wall 13 on the side of the filter on which the filter cake is removed while the other side is open and communicates with a trough 14 in which a rotating flinger 15 operates. The flinger 15 comprises a shaft 16 and blades 17 and is driven by motor 18. The inner feed slurry receptacle or pan is formed with a major arcuate wall 19 and side walls 20. Common end walls 22 are provided for both pans.

The hollow filter drum 23 is suitably supported on the filter drum shaft 24 in the usual manner and is rotated by conventional means. A filter cloth 25 covers the drum 23. By the term filter cloth, we mean porous media made of natural or synthetic fibers or metals. The filter cloth can be made of natural fibers such as cotton duck or twill or wool, synthetic fibers such as "nylon" or "Vinyon," or metal fabrics such as woven iron wire cloth or "Monel" wire cloth or stainless steel cloths. Also, asbestos cloth and nonwoven fabrics can be used. Suitable conventional valving, piping and sections are provided within the drum 23 to provide the suction or air blow as desired for the removal of filtrate.

An agitator for the slurry in the inner and outer pans is provided and comprises rakes 26, plate 27 and arm 28 operated by eccentric 29 operated by motor 30. Pan agitation can be by any means, however, such as air blowing, or agitator shafts having propellers, turbines, etc. as impellers.

Spray headers 31 and 32 of conventional design are provided. A knife 33 which can be adjusted by threaded rod 34 passing through nuts 35 attached to the knife support 36 is used to remove the filter cake. A cake removal chute 37 is provided. A baffle frame 38 is provided to cover the drum 23.

In operation, the rotary vacuum filter picks up a cake 39 on the filter cloth 25 on drum 23 from the feed slurry in the feed slurry zone 40 formed by the inner vessel in position A. Feed slurry is introduced through feed inlet 41 into the feed slurry vessel. The feed slurry is agitated by rake 26 of the agitator mechanism to keep the solids in suspension. As the drum revolves from position A to position B, product liquid is drawn from the cake by the vacuum applied. Simultaneously, a ½" to ¾", for example, coating 42 of reclaim slurry, containing recoverable product, is applied to the cake in the form of discrete droplets by the flinger 15. The liquid portion of this reclaim slurry immediately upon striking the surface of the cake begins moving through the cake and by displacement causes more of the product material to be removed from the cake. The solids are deposited on the cake already present and seal any cracks which may have formed due to shrinkage.

As the drum revolves from position B to position C, additional liquid values are displaced from the cake by the application of wash liquors or water from sprays 31.

Figure 2:
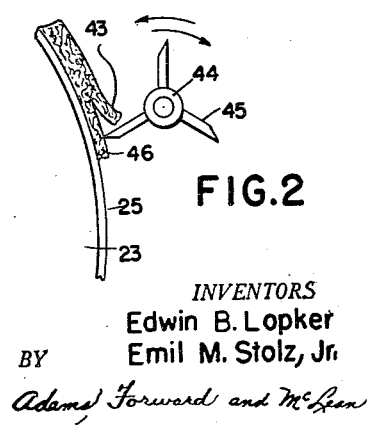
Figure 2 is a partial view of the filter of Figure 1 in which a rotating knife is used to remove the cake instead of the rigid adjustable knife of Figure 1.
Figure 5:
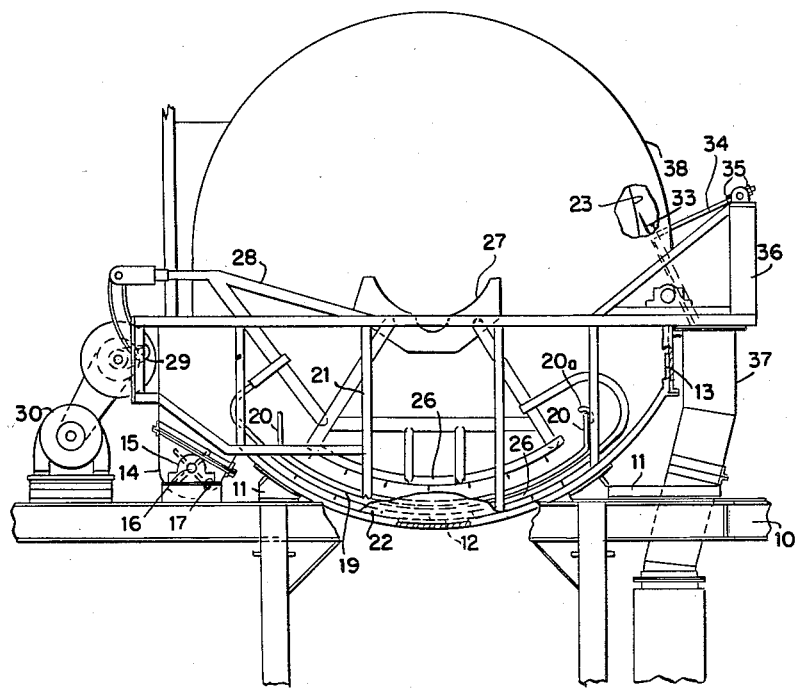
Figure 5 is an end view of the filter of Figure 1.
Figure 6:
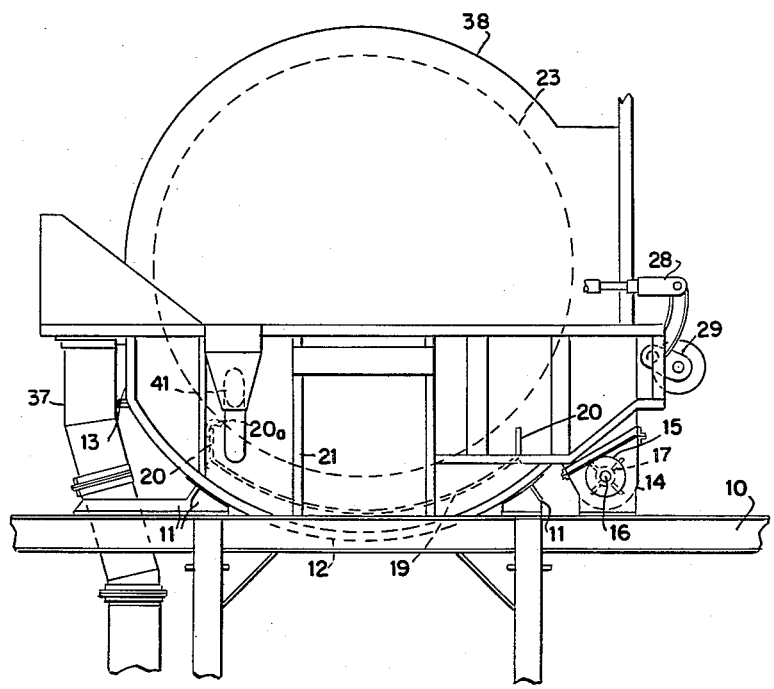
Figure 6 is the other end view of the filter of Figure 1.
Figure 7:
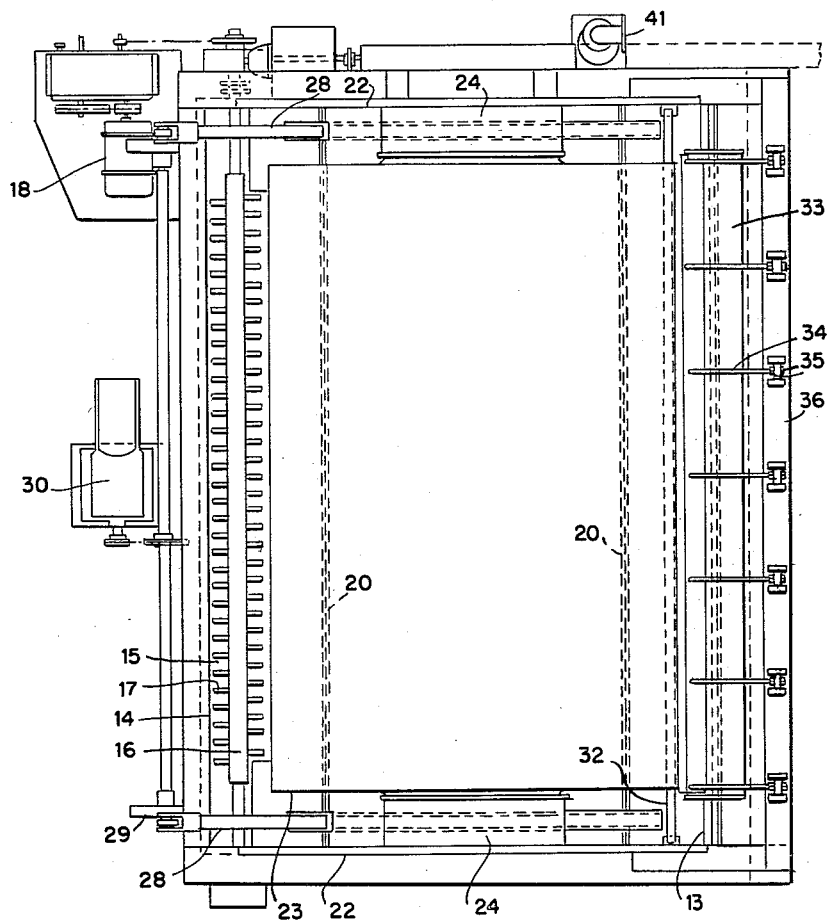
Figure 7 is a top plan view of the filter of Figure 1.

As the drum revolves from position C to position D, the adjustable knife 33 mounted across the face of the filter shears off the outer portion 43 of the total cake formed from the feed slurry and reclaim slurry. Any other suitable means for removing the cake can be used, however. For example, a rotating knife as shown in Figure 2, comprising a shaft 44 rotated by conventional means and a plurality of blades 45 attached thereto which when rotated flip off the outer portion of the cake can be used. The knife can rotate in either direction. Other means for removing the cake include a stationary or moving wire, a knife blade moving as a saw, a knife blade moving as a chopper and a rotating helical screw. The outer portion 43 of the sheared cake which is washed almost free of liquid values falls down the disposal chute 37 and is discarded or recovered as desired.

As the filter sections pass through position D, the vacuum is cut off and air is forced into the sections. This, along with wash liquors or water from spray headers 32 cause the remaining inner portion 46 of the cake 39 to be dislodged from the filter cloth 25. Any suitable means can be employed to remove the inner portion of the cake, however. For example, air blowing alone or water washing alone can be used. The dislodged inner cake falls into the outer pan reclaim slurry zone 46a. The filter cloth which is now exposed is washed by wash liquor or water from spray headers 32. This wash liquor is blown off the filter cloth by the air pressure applied in position D causing the wash liquor to fall into the outer slurry pan. The air blow also blows any liquid remaining in the internal pipes and drum section through the filter cloth and into the outer pan. While the air blow usually blows all of the cake and liquors into the outer recycle slurry zone 46a, a flexible strip or wiper 20a can be attached to the side wall 20, if desired, to form a tight seal with the drum to insure that no cake or wash water from spray headers 32 or liquor can enter the inner feed slurry zone. The cake and the liquors falling in the outer pan form a slurry in the zone 46a formed by the outer pan. The liquor is mixed by the agitator rake 26 and conveyed to the opposite side of the outer pan whereupon this slurry falls into the flinger trough 14. The flinger 15 then returns this slurry to the cake in position B, completing the cycle.

Figure 4:
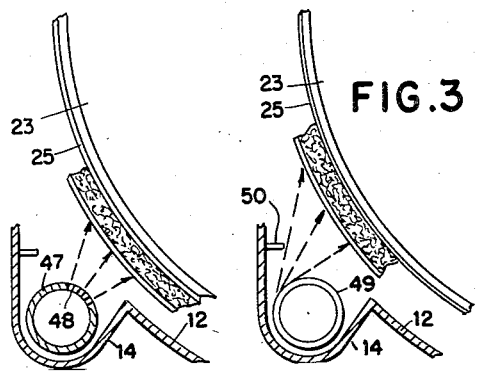
Figure 4 is a partial view of the filter of Figure 1 in which the recycle slurry is applied by means of a spray header instead of the flinger of Figure 1.
Figure 3:
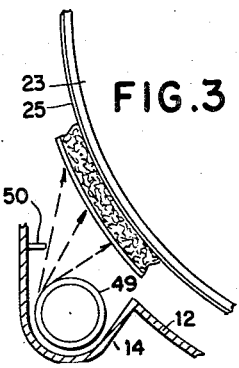
Figure 3 is a partial view of the filter of Figure 1 in which a rotating cylinder is used to apply the recycle slurry to the filter cake instead of the flinger of Figure 1.

Any suitable means for applying the reclaim slurry to the cake can be used. For example, the slurry can be sprayed on the cake as shown in Figure 4 from a spray header 47. This method is not as desirable as the flinger method, however, as difficulties occur in plugging of the spray nozzles 48. Also, the means can comprise a cylinder 49 as shown in Figure 3. Also, the slurry can be applied from a feed box which flows the reclaim slurry onto the newly formed cake. An adjustable directing plate 50 is provided so that only slurry from the flinger trough 14 which falls on the filter cake 39 can leave the trough. Slurry whose trajectory would cause it to miss the filter cake 39 is deflected back into the flinger trough 14 to be recycled.

In Figures 9 and 10, the operation is similar to the filter of Figures 1 to 8 except that the inner cake 46 is received and conveyed, for example, by a screw conveyor 51 running the length of the filter, to an extraneous tank 52 where the reclaim slurry is formed. The reclaim slurry is then conveyed to the flinger trough 14, for example, by means of a pump 53 and line 54 for application to the surface of newly formed cake 39. In this filter, then, only the feed slurry receptacle or pan is needed and this zone 55 is formed by arcuate wall 56 and side walls 57 and end walls (not shown). A dividing wall 58 and a flexible strip or wiper 59, e. g. a rubber strip, is provided to form a tight or substantially perfect seal with the drum so that no cake or wash water from spray headers 32 enters the feed slurry zone 55. Thus, no dilution of the feed slurry can occur.

It is important that the inner portion of the cake be removed and reslurried separate from the feed slurry and then applied to the top surface of the newly formed cake if successful operation is to be obtained. Thus, when the outer portion of the cake is removed and the inner portion is left on the filter medium which then dips into the feed slurry so that new cake is formed on top of the inner portion of the old cake, the filter becomes inoperable in a short time due to blinding, i. e. an impervious mass of solids is formed by the fines of the inner cake so that air cannot be pulled through the cake and cloth. In our method, however, our complete recycle of the inner portion of the cake is operable since the inner portion is reslurried and recycled separate from the feed slurry so that it overcoats newly formed cake and thus is discarded or recovered on the next revolution of the drum when the knife removes it from the outer portion of the cake.

The novel method and filters of our invention correct the above-described specific faults of conventional rotary vacuum filters. For example, as noted above when the particle size and shape of the solids in a slurry do not lend themselves to good washing, the wash water applied in position C by conventional filters tends to run off the cake and fall into the feed slurry pan which causes dilution of the slurry and resultant dilution of the filtered product. This fault is corrected in two ways by our invention. As the flinger throws a very uniform, wide-coverage recycle slurry on the cake picked up from the inner feed pan, cake washing is started on our filter as soon as the cake emerges from the inner feed slurry pan. This action begins to displace the strong liquid from the cake in position B so that when wash liquid is applied from spray headers the wash liquid is sucked through the cake much more readily, thereby eliminating or radically reducing run-off of wash liquors. Also, should any slight run-off occur on our filter, it cannot fall into the inner feed pan but must fall into the outer recycle pan because of the arrangement of the inner pan and the outer pan. This harms nothing since this run-off is returned to the cake as primary wash liquor by the flinger.

Concerning cake removal problems, only that portion of cake which is thoroughly washed is discarded from our filter. The knife is set to shear off and discharge only thoroughly washed cake while the less thoroughly washed inner cake is recycled by the arrangement described. The knife may be set to shear off any desired portion of cake. No such practical separation of cake is possible on current commercial rotary vacuum filters since without the double pan arrangement dilution occurs if the outer cake is cut off and the inner cake dropped into the feed slurry pan.

The filter cloth on our rotary filter is water washed and air-blown on every drum revolution. This innovation makes it possible for the filter to operate at top capacity and top efficiency for much longer periods than previously possible on standard rotary filters. Some filters do have arrangements for washing the filter cloth. However, on these filters, a series of costly rolls, guides, trackers, wash tanks, etc. are used to do the same job that our filter does with no added equipment.

As described above, whenever a cake is encountered which cracks upon the application of vacuum, a standard vacuum filter is in serious difficulties; the capacity drops, washing efficiency becomes very poor and wash water runs off the cake and falls into the feed slurry pan. The flinger on our filter, however, applies a coating of recycle slurry which seals the cake as it emerges from the inner feed pan sealing any cracks that may have formed and thereby always gives good operation.

In a standard filter using an air-blow to dislodge the cake after it is washed, liquid remaining in the internal piping and the drum sections is blown through the filter cloth and into the cake which is being discarded. Some of the liquid also drops into the slurry pan and dilutes the slurry. In our filter, the washed cake is first removed, then the remaining cake, liquid in the drum sections, and liquid in the internal piping are all blown out of, and washed out of, the filter into the outer recycle slurry pan and are recycled and recovered. Neither dilution of the slurry in the feed pan nor loss of recoverable liquid values can thus occur in our filter.

Separation of a slurry into its solid and liquid components is more comlete on our rotary vacuum filter than on other rotary vacuum, table or belt filters. Specifically, in the separation of a phosphoric acid slurry into phosphoric acid and gypsum, loss of soluble $P_2O_5$ in the gypsum on our filter is only $\frac{1}{5}$ to $\frac{1}{10}$ the loss incurred on conventional vacuum filters handling the same slurry. When a conventional filter is recovering 98% of the phosphoric acid in a slurry, our filter is recovering 99.6% to 99.8% of the acid at the same or slightly higher filter rate as demonstrated by the examples set forth below.

By the term "slurry" as used herein, we mean a suspension of solids in a liquid, e. g., water or a solution. Our method and apparatus is applicable to slurries in which the particle size of the solids range from about 5 microns or slightly smaller to larger than 200 microns. In vacuum operations, slurries containing up to or slightly over 50% solids can be used. In general, our method and apparatus are applicable to the filtration of such slurries as are conventionally filtered by drum or equivalent filters.

The method of our invention is applicable to any continuous method of vacuum or pressure filtration as opposed to batch-type filters such as the plate and frame Shriver filter press. Included among the types of filters which can be modified to operate according to our method are the rotary vacuum type of filter such as the Oliver rotary-drum vacuum filter described above, the vertical disk-type rotary vacuum filter in which the filter area is arranged in vertical disks rather than on the circumference of a drum, the Oliver horizontal filter in which pie shaped filter sections rotate horizontally in a pan, the Lurgi filter in which an endless belt comprising the filter cloth passes over two horizontal drums or pulleys and over horizontal suction boxes (the formed cake being removed at the end pulley), and the Bird-Young filter in which the entire inside of the drum is subject to vacuum and cake discharge is done by a pulsating-air blowback. In the last filter referred to, a divider is provided to separate outer cake from inner cake when removed by air blowing. Also, the Prayon filter in which a horizontal wheel-like arrangement of filter sections is rotated through the feed slurry is readily adapted for the practice of our invention.

The method and filters of our invention can be used in a wide range of applications. For example, they are applicable to the separation of phosphoric acid from slurries of calcium sulfate in phosphoric acid formed by digesting phosphate rock with sulfuric acid in wet-process phosphoric acid manufacture, the production of sodium carbonate, separation of calcium carbonate precipitated in the manufacture of caustic soda by the lime-soda ash process, recovery of salt, sugar, pigments such as lithopone, food products, paper pulp, petroleum products and other materials, ore treatment, etc.

Our invention will be illustrated by the following examples in which the filter illustrated by Figures 1 and 5-8 was used to filter slurries of calcium sulfate in phosphoric acid.

EXAMPLE I

Commercial grade phosphate rock was acidulated in the proportion of one ton to 1.10 tons of 77% sulfuric acid. During the acidulation, weak recycle phosphoric acid, containing 2800 pounds $P_2O_5$, was added to dilute the slurry. The resultant slurry contained 17.4% solids. The slurry was filtered on the filter illustrated by Figures 1 and 5-8. The drum had a radius of 4 feet and a length of about 12 feet. The filter cloth was made of wool. The drum speed was 0.3 R. P. M. The cake picked up by the drum was 1¾ inches thick. The knife was set to peel off the outer 1¼ inch of cake which was discarded; the inner ½ inch of cake was recycled and was applied to the newly formed filter cake on the next drum revolution. Approximately 1.2 pounds of wash water, including the liquor in the recycle cake, was used per pound of discarded cake. Slightly over 99.7% of the solubilized $P_2O_5$ was recovered. The acid produced by the filter had a specific gravity of 1.275 and contained 2.62 pounds $P_2O_5$ per gallon.

Using the same operating conditions on a conventional commercial rotary vacuum filter, i. e. a filter similar to that of Figures 1 and 5-8 except that a single slurry pan is used and there is no application of reclaim slurry to the filter cake, the solubilized $P_2O_5$ recovery is only 98%, and the acid produced has a specific gravity of only 1.253 and contains only 2.42 pounds $P_2O_5$ per gallon.

EXAMPLE II

Commercial grade phosphate rock was acidulated in the proportion of one ton to 0.93 tons of 93% sulfuric acid. During the acidulation, weak recycle phosphoric acid containing 700 pounds $P_2O_5$ was added to dilute the slurry. The resultant slurry contained 37.2% solids. The slurry was filtered on the filter of Example I. The drum speed was 0.8 R. P. M. The cake picked up by the drum was 1⅜ inches thick. The knife was set to peel off the outer 1 inch of cake; the inner ⅜ inch of cake was recycled and reslurried and was applied to the newly formed filter cake on the next drum revolution. Approximately 1.1 pounds of wash water, including the liquor in the recycle cake, was used per pound of discarded cake. Slightly over 99.6% of the solubilized $P_2O_5$ was recovered in the product acid and weak liquor. The acid produced by the filter had a specific gravity of 1.295 and contained 2.80 pounds $P_2O_5$ per gallon.

Using the same operating conditions on the conventional commercial rotary vacuum filter, the solubilized $P_2O_5$ recovery is only 98% and the acid produced has a specific gravity of only 1.275 and contains only 2.62 pounds $P_2O_5$ per gallon.

EXAMPLE III

Commercial grade phosphate rock was acidulated in the proportion of one ton to 1.10 tons of 77% sulfuric acid. During the acidulation, weak recycle phosphoric acid containing 1400 pounds $P_2O_5$ was added to dilute the slurry. The resultant slurry contained 24.3% solids. The slurry was filtered on the filter of Example I. The drum speed was 0.5 R. P. M. The cake picked up by the drum was 1⅞ inches thick. The knife was set to peel off the outer 1⅛ inch of cake; the inner ¾ inch of cake was recycled and reslurried and was applied to the newly formed filter cake on the next drum revolution. Approximately 1.2 pounds of wash water, including the liquor in the recycle cake, was used per pound of discarded cake. Approximately 99.65% of the solubilized $P_2O_5$ was recovered in the product acid and weak liquor. The acid produced by the filter had a specific gravity of 1.240 and contained 2.35 pounds $P_2O_5$ per gallon.

Using the same operating conditions on the conventional commercial rotary vacuum filter, the solubilized $P_2O_5$ recovery is only 98% and the acid produced has a specific gravity of only 1.229 and contains only 2.30 pounds $P_2O_5$ per gallon.

While the filter drum speed in the above examples varied from 0.3 to 0.8 R. P. M., these speeds are not limiting ones and the drum can be operated at slower or considerably faster speeds.

We claim:

1. In the filtering of suspensions of solids wherein a feed slurry is subjected to filtration through a filter cloth and a filter cake is formed on the medium and removed in a continuous operation, the improvement which comprises continuously removing an outer portion of the cake, continuously removing an inner portion of the cake, continuously forming and maintaining a slurry of the inner portion of the cake separate from the feed slurry and continuously applying said slurry of the inner portion of the cake to the outer surface of the filter cake newly formed from the feed slurry.

2. The process of claim 1 in which the filter cake to which the slurry of the inner portion of the cake has been applied is washed before removal of any portion of the cake.

3. The process of claim 1 in which the filter cloth is washed following the removal of the inner portion of the cake.

4. The process of claim 2 in which the filter cloth is washed following the removal of the inner portion of the cake.

5. The process of claim 4 in which the feed slurry comprises a slurry of calcium sulfate in phosphoric acid and the filter cake comprises calcium sulfate.

6. In the filtration of suspensions of solids wherein a feed slurry is subjected to filtration through a filter cloth on a rotary drum which passes through the feed slurry whereby a filter cake is formed on the cloth and removed in a continuous operation, the improvement which comprises continuously removing an outer portion of the cake from the filter cloth on the drum, continuously removing an inner portion of the cake from the filter cloth on the drum, forming and maintaining a slurry of the removed inner portion of the cake separate from the feed slurry, and continuously applying the slurry of the inner portion of the cake to the outer surface of the cake newly formed on the filter cloth from the passing of the drum through the feed slurry.

7. The process of claim 6 in which the filter cake to which the slurry of the inner portion of the cake has been applied is washed before removal of any portion of the cake.

8. The process of claim 6 in which the filter cloth is washed following the removal of the inner portion of the cake.

9. The process of claim 7 in which the filter cloth is washed following the removal of the inner portion of the cake.

10. The process of claim 9 in which the feed slurry is a slurry of calcium sulfate in phosphoric acid and the filter cake comprises calcium sulfate.

11. In a filter wherein a filter cake is formed on a filter cloth from a feed slurry of solids, the combination therewith of means for removing an outer portion of the filter cake, means for removing an inner portion of the filter cake, a receptacle for receiving the inner cake separate from the feed slurry in which inner cake receptacle a slurry of the inner cake is formed and means for applying said slurry from the said inner cake receptacle to the outer surface of filter cake newly formed on the filter cloth.

12. The filter of claim 11 in which the means for removing the outer portion of the cake is a rigid adjustable knife.

13. The filter of claim 11 in which the means for removing the outer portion of the cake is a rotating knife.

14. The filter of claim 11 in which the means for applying the slurry from the inner cake receptacle to the newly formed cake on the filter cloth comprises a rotating member having a plurality of blades which engage the slurry and direct it to the filter cake.

15. In a rotary filter, the combination of rotatable drum carrying a filter cloth and a receptacle for holding a feed slurry of solids and into which receptacle the drum and filter cloth pass and a filter cake of the solids is formed on the filter cloth, means for removing an outer portion of the filter cake from the cloth on the drum, means for removing an inner portion of the filter cake from the cloth on the drum, a receptacle separate from the feed slurry receptacle for receiving the inner portion of the filter cake and in which separate receptacle a slurry of the inner cake is formed, and means for coating the cake newly formed on the filter cloth with said slurry of inner cake.

16. The filter of claim 15 in which the receptacle for receiving inner filter cake is attached to and forms an outer portion of the feed slurry receptacle.

17. The filter of claim 16 in which the means for removing the outer portion of the cake is a rigid adjustable knife.

18. The filter of claim 16 in which the means for removing the outer portion of the cake is a rotating knife.

19. The filter of claim 16 in which the means for applying the slurry from the inner cake receptacle to the newly formed cake on the drum comprises a rotating member having a plurality of blades which engage the slurry and direct it to the filter cake.

20. The filter of claim 15 in which the inner cake receptacle is an extraneous receptacle.

No references cited.